Aug. 14, 1951 A. E. CANFORA 2,564,559

ELECTRONIC PHASE SHIFTING SYSTEM

Filed April 29, 1947

2 Sheets-Sheet 1

INVENTOR.
Arthur E. Canfora

BY

H. S. Grover

ATTORNEY

Aug. 14, 1951 A. E. CANFORA 2,564,559

ELECTRONIC PHASE SHIFTING SYSTEM

Filed April 29, 1947 2 Sheets-Sheet 2

INVENTOR.
Arthur E. Canfora

BY H. G. Grover.

ATTORNEY

Patented Aug. 14, 1951

2,564,559

UNITED STATES PATENT OFFICE 2,564,559

ELECTRONIC PHASE SHIFTING SYSTEM

Arthur E. Canfora, Brooklyn, N. Y., assignor to Radio Corporation of America, a corporation of Delaware Application April 29, 1947, Serial No. 744,645

8 Claims. (Cl. 250—27)

My invention relates in gentral to circuits and apparatus for shifting the phase of an electrical wave formation and, more particularly, to such an apparatus that is entirely electronically controlled.

In certain systems for the transmission and reproduction of intelligence, such, for instance, as in the art of facsimile and/or teletype transmission, it is necessary that synchronism be maintained between a rotating device located at the transmitter and a rotating device located at the receiver or reproducer. In the facsimile art, for example, in one system, the recorded optical image to be transmitted is held in a fixed position and a rotating optical system traverses the recorded image to scan it in a line by line manner. In another embodiment of this art, the recorded material to be transmitted may be wound about a drum in a fixed definite position and the drum may be rotated so that line by line scansion is accomplished by an optical system which is moved along parallel to the major axis of the drum. In both of these systems mentioned for illustration, there is developed at the end of each scansion line a signal which is indicative of the position or phase of the optical system in the first illustrative example and of the drum in the second illustrative example. This signal, which is termed the line synchronizing signal, indicates the instantaneous position of a rotating element at the transmitter and with which a rotating element at the receiver must be maintained in synchronism.

Reproduction of the signals developed by scansion at the transmitter is accomplished line by line on a recording surface at the receiver. In accordance with one system, a conducting spiral or helical member or strip is carried upon a recording drum member. A chemically treated paper, upon which the image record is to be recreated, is inserted between the spiral or helix member and a long bar-like electrode. Signals representative of the image to be produced in the record strip are impressed across the drum spiral or helix and the elongated electrode. As the drum is rotated, the current flow, representative of the signal, as it passes through the treated record strip or impregnated paper in flowing between the bar and helix causes an electrolytic effect to take place within the record strip or paper to reproduce incremental areas of the optical image which are represented by the transmitted signals. The record supporting drum of the receiver must be kept moving in synchronism with the rotating element at the transmitter so that a line by line scansion is accomplished which is similar to the analysis which occurs at the transmitter. Some representative examples of facsimile scanners and recorders may be found in U. S. Patent No. Re. 20,152 to C. J. Young, granted October 27, 1936; No. 1,746,407, granted February 11, 1930, to Schroeder et al; No. 1,792,264 to Alexanderson, granted February 10, 1931; No. 2,215,806 to C. J. Young, granted September 24, 1940; No. 2,314,027, granted March 16, 1943, to C. J. Young; No. 2,354,571, granted July 25, 1944, to Blaim; No. 2,391,765, granted December 25, 1945, to Maurice Artzt; No. 2,394,649, granted February 12, 1946, to C. J. Young; and No. 2,413,400, granted December 31, 1946, to C. J. Young.

Since the motor driving the rotating element for accomplishing scansion line by line at the transmitter and that driving the rotating element at the receiver usually are not operated from the same power source, there is generally a tendency on the part of one of the rotating elements to drift out of exact synchronous relationship with the other of the rotating elements. Synchronous relationship between these two rotating devices usually is maintained by shifting the phase of the driving source at the receiver, when the standard sources of power, or the drums, have drifted out of phase, by a predetermined number of electrical or mechanical degrees and this shift in phase is utilized to bring the drum at the receiver back into a synchronous relationship with respect to the drum at the transmitter.

Among the presently known methods of and apparatus for accomplishing the required shift in phase is one wherein the signal is compared in phase with the phase of the power source at the receiver and a displacement between the correct phase and the actual phase causes the changing of the phase of the power source by mechanical means, in a phase shifting network. A second method of and apparatus for accomplishing the phase shift utilizes the result of a phase comparison between the signal and the source of power at the receiver to control, by mechanical means, the relative positioning between a plurality of inductors which are used in conjunction with a phase shift network to accomplish the desired shift in phase.

A third method of and apparatus for accomplishing the shift in phase which is necessary to bring the receiving rotating element back into synchronism with the rotating element at the transmitter is by utilizing the result of a comparison between the received signals and the power source at the receiver to drive an auxiliary motor which, when it is activated, physically turns the frame of the motor that is driving the rotating element at the receiver with respect to the armature of that motor.

All three of these methods employ moving mechanical parts and are subject to certain disadvantages. Accordingly, it is an object of my invention to provide a method of and apparatus for shifting the phase of an electrical wave and which is entirely electronically controlled.

A further object of the invention is to provide a method of and apparatus for shifting the phase of an electrical wave formation under the control of correction pulses obtained by comparing the signals, such as synchronizing signals, with the local power source, and wherein the phase shift is made in definite incremental steps of 90° each.

A still further object of this invention is to provide a method of and apparatus for shifting the phase of an electrical wave formation under the control of correction pulses and wherein the phase shift will always be in a desired direction, i. e., the phase of the wave formation will always be either advanced or retarded as may be desired.

Other objects and advantages of my invention will be apparent to those skilled in the art to which this invention belongs from a reading of the hereinafter appended specification.

My invention contemplates, in general, the provision of an electrical wave formation whose phase is to be either advanced or retarded by incremental fixed sums and the provision of a source of correction pulses under the control of which the phase shift will be accomplished and which may be synchronizing pulses such as have been referred to hereinbefore. If the wave formation whose phase may be shifted has a frequency which is the same as that of the desired phase shifted wave, then the available wave whose phase is to be shifted must first be doubled in frequency before it is applied to the electronic phase shifter because the circuit inherently divides an applied frequency by two. This new frequency is used to control a multivibrator whose output is also twice the desired frequency.

There is provided a second multivibrator which is of the multi-stroke type and in which the output frequency therefrom is one-half that of the input frequency. There are provided, in conjunction with the second multivibrator, two control paths and the conducting state of the second multivibrator is controlled by the first multivibrator in accordance with which of the two conducting paths is operated. In the exemplified embodiment of this invention, these two conducting paths comprise a pair of thermionic tubes and, on the control grid of each, there are impressed the output pulses from one of the tubes of the first multivibrator. The conducting state of each of these thermionic tubes is controlled by the conducting state of a gaseous discharge tube of the so-called "thyratron" type, for instance, and the conducting state of the latter, in turn, is controlled by the correction pulses.

A circuit is provided under the control of the second multivibrator which assures the control of the conducting state of the gaseous discharge tube by the correction pulses only during definite parts of the cycle of operation of the second multivibrator and, when the correction pulses are allowed to control the gaseous discharge tube, a phase shift of the output wave of the second multivibrator of 90° is accomplished. This may be so as to be in either direction, i. e., the phase of the output wave of the second multivibrator may be advanced by 90° or it may be retarded and each change in phase thereafter will be in the same direction.

Hereinafter in this specification the grid controlled gaseous discharge tubes will be referred to as grid glow tubes.

My invention will best be understood by reference to the drawings in which.

Figure 4:
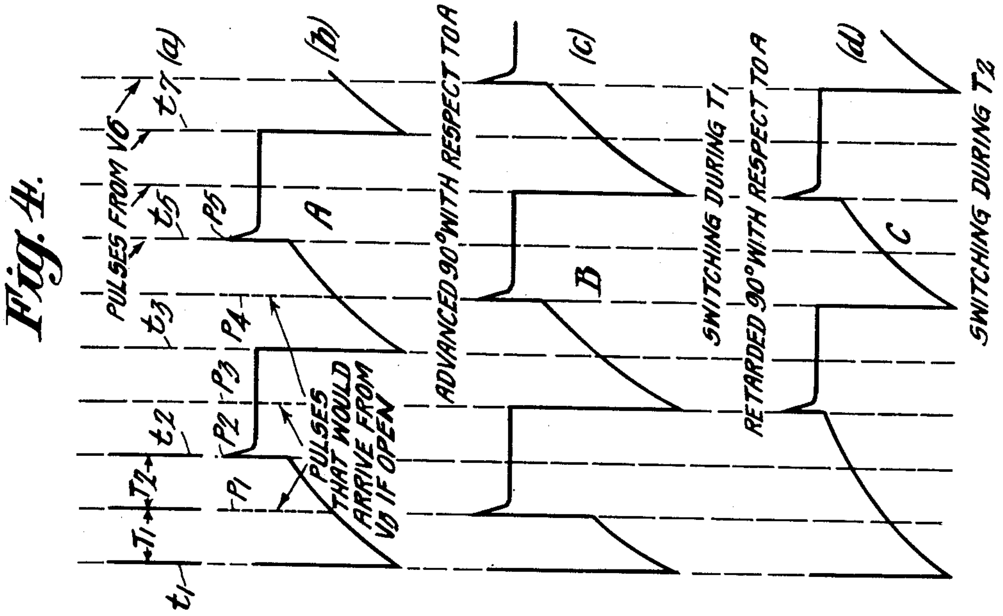

Fig. 4, sections *a* through *d*, are a set of explanatory curves.

Figure 1:
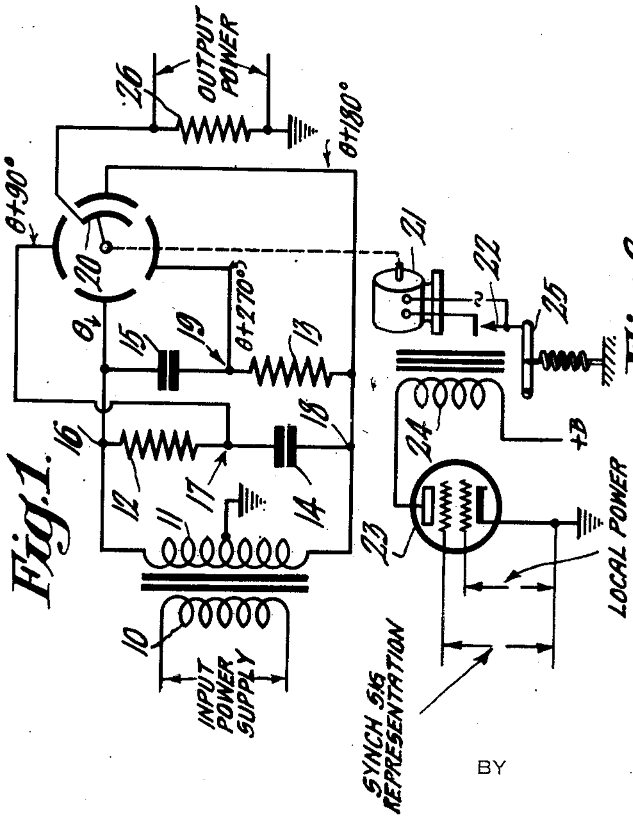
Fig. 1 is a schematic diagram of an apparatus for shifting the phase of a recurring wave by mechanically picking up a wave or waves of different phase relationships by rotating a condenser plate with respect to four fixed plates.

Referring to Fig. 1, there is shown as an example of a setting for the present invention, a heretofore utilized arrangement for changing the phase of an electrical wave in accordance with its relative phase.

Figure 2:
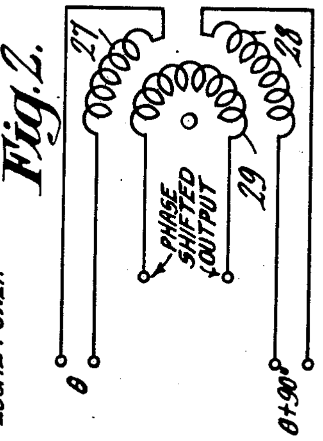
Fig. 2 is a schematic showing of a so-called "circuitrol" element.

Fig. 2 shows a so-called "circuitrol" arrangement for obtaining an output wave which is shifted in phase with respect to an input wave. The apparatus used in conjunction with the arrangement of Fig. 2 would be somewhat similar to the arrangement of the phasing condenser shown in Fig. 1. The tube 23 and the motor 21 of Fig. 1 are used with the arrangement of Fig. 2. The motor can be used to rotate the inductance 29.

Figure 3:
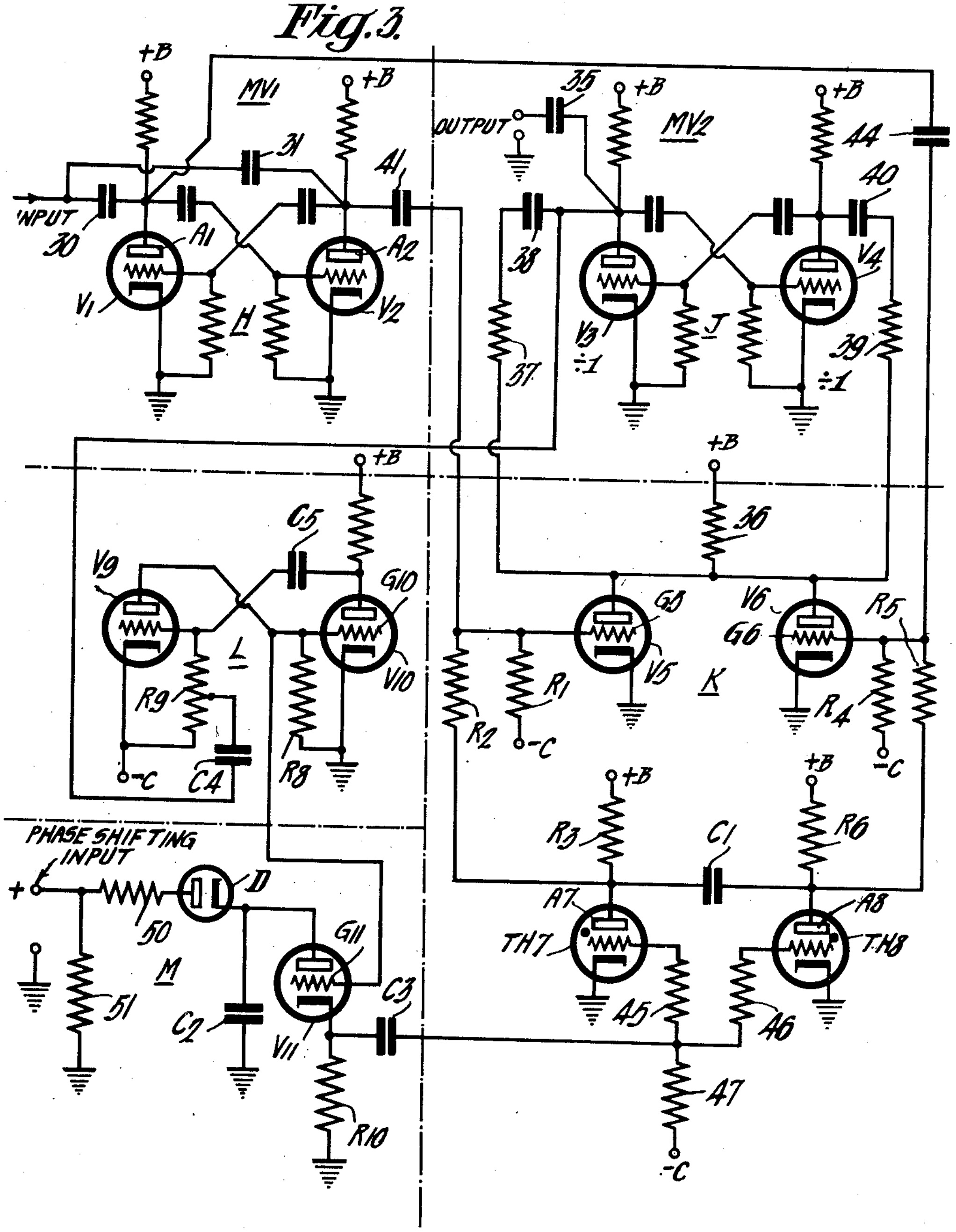
Fig. 3 shows an embodiment of my invention.

Referring to Fig. 3, there is shown an exemplified embodiment of my invention in the form of a circuit diagram. In this diagram, the apparatus has been separated into its component units by dashed and dotted lines in order to make reference to the various parts thereof easier. In the arrangement of this figure, pulses having a definite frequency and which are to be changed in phase under certain circumstances, as will be explained hereinafter, are impressed through condensers 30 and 31 onto the anodes of two tubes $V_1$ and $V_2$ forming a multivibrator. Each of the tubes has the anode connected to a source of positive potential through appropriate resistance elements and the grid of each tube is cross-connected to the anode of the opposing tube through an appropriate capacitor. The grid of each tube is connected to the cathode thereof through appropriate resistance elements and one side of the cathode of each tube is grounded. This is a conventional form of multivibrator and does not, of itself, form the essence of this invention and, accordingly, there is no necessity for a detailed explanation of its operation which is well known to those skilled in the art to which this invention belongs. In this particular instance, the parameters of the circuit are chosen so that the output frequency of the utilized waves taken from the anode of $V_1$ and that of $V_2$ will be equal to that of the input frequency. This multivibrator unit will be referred to hereinafter as the unit H and it will be appreciated that two output signals may be derived therefrom which are of equal frequency and 180° out of phase with each other and are, in general, rectangular in wave shape.

There is provided a second multivibrator unit comprising thermionic tubes $V_3$ and $V_4$ and the general construction of this multivibrator is the same as that of the unit H, i. e., the multivibrator has the anodes of $V_3$ and $V_4$ connected to a source of positive potential through resistance elements.

the grids of the tubes are cross-connected to the anode of the opposing tube through an appropriate capacitor and the grid of each tube is connected to its cathode through an appropriate resistor and the cathodes are grounded. In this particular arrangement, the output wave, which will correspond in frequency to that of the wave input to the first multivibrator which comprises the unit H but which will be phase displaced with respect thereto under certain conditions, may be taken from the second multivibrator from the anode of tube $V_3$ and through coupling condenser 35 and between the terminals of the coupling condenser and ground, as shown in the drawing. This multivibrator will be referred to hereinafter as the unit J. The parameters of this multivibrator are so chosen that it will act as a multi-stroke multivibrator, i. e., it will enter one portion of its cycle of operations by the impression of one control pulse thereon and will return to its initial state by the impression of a second pulse thereon. This then effectively comprises a frequency divider in which the output wave is half the frequency of the control waves impressed thereon.

There are provided two vacuum tubes $V_5$ and $V_6$ both of which have the anodes thereof connected to a source of positive potential through an appropriate common resistance element 36. The anode of $V_5$ is connected to the anode of $V_3$ through serially connected resistor 37 and condenser 38. The anode of $V_6$ is connected to the anode of $V_4$ through serially connected resistor 39 and condenser 40.

The grid $G_5$ of tube $V_5$ is connected to the anode of tube $V_2$ through condenser 41. The grid also has impressed thereon a negative potential supplied from a source indicated by the symbol —C and this is impressed onto the grid resistor $R_1$. Similarly, the grid $G_6$ of vacuum tube $V_6$ is connected to the anode of tube $V_1$ of the unit H through condenser 44 and this grid also is biased negatively by a potential source through a resistor $R_4$.

There are provided two control tubes $TH_7$ and $TH_8$ which are grid glow tubes. Each of the tubes has the anode thereof connected to a source of positive potential through an appropriate resistance element, resistances $R_3$ and $R_6$ being used for this purpose. The anodes are connected together through condenser $C_1$. The anode of tube $TH_7$ is connected to the grid $G_5$ of tube $V_5$ through resistor $R_2$ and the resistances $R_1$, $R_2$ comprise a voltage divider circuit. Similarly, the anode of tube $TH_8$ is connected to the grid $G_6$ of tube $V_6$ through resistance member $R_5$ and the resistances $R_4$, $R_5$ comprise a voltage divider similar to that of resistances $R_1$ and $R_2$. The grid of tube $TH_7$ is connected to the grid of tube $TH_8$ through resistances 45 and 46, and the common terminal of these resistances is joined to a source of negative potential identified by the symbol —C through a resistance 47. The tubes $V_5$ and $V_6$ and the tubes $TH_7$ and $TH_8$, with their associated circuit elements, will be referred to hereinafter as the unit K and it is this unit which forms the control for accomplishing the effective phase shift of the waves impressed onto the multivibrator of the unit J.

A third multivibrator of the self-restoring type, or the "one-stroke" type, is provided and is identified as the unit L. This multivibrator comprises thermionic tubes $V_9$ and $V_{10}$. The anode of $V_9$ is connected directly to the grid of $V_{10}$ and the grid itself is connected to the cathode of $V_{10}$ through resistor $R_8$. The grid of $V_9$ is connected to the anode of $V_{10}$ through condenser $C_5$ and the grid is returned to cathode through resistor $R_9$. The cathode is connected directly to a source of negative potential which is indicated by the symbol —C. A tapped point on resistor $R_9$ is connected to the anode of tube $V_3$ of the unit J through condenser $C_4$.

There is further provided a thermionic tube $V_{11}$ which acts as a control tube to influence the grid glow tubes of the unit K. The anode of tube $V_{11}$ is grounded through a condenser $C_2$ and is also connected directly to the cathode of a diode or other form of rectifier or detector D. The anode of the diode or other rectifier D is grounded through serially connected resistors 50 and 51. Signal input to this diode or other rectifier is made between the common terminal of resistors 50 and 51 and the ground point as indicated in the drawing. The input pulses which act as correction pulses are impressed onto the circuit in a positive polarity as also indicated and it is these pulses which act to accomplish the phase shift under certain conditions.

The cathode of tube $V_{11}$ is grounded through resistor $R_{10}$ and is connected through condenser $C_3$ to the common terminal of resistors 45 and 46 of the unit K.

The action of the circuit, which will be better understood with reference also to Fig. 4, is as follows:

Since the anodes of $V_5$ and $V_6$ are connected through appropriate coupling members to the anodes of tubes $V_3$ and $V_4$ respectively, pulses occurring in the anodes of $V_5$ and $V_6$ will change the operating state of the multivibrator comprising the unit J since this multivibrator is of the multi-stroke type, i. e., when it is in a definite portion of its cycle, its transition to the other portion of its cycle of operation may be accomplished by pulses of correct polarity applied to the anode of one of its tubes. In turn, the conducting state of tubes $V_5$ and $V_6$ is controlled by the conducting state of the tubes $V_1$ and $V_2$ of the multivibrator comprising the unit H since the anode of $V_1$ is connected to the grid of $V_6$ through capacitor 44 and the anode of $V_2$ is connected to the grid of $V_5$ through capacitor 41. The grids of $V_5$ and $V_6$ are biased by the negative sources of potential indicated by the symbol —C so that these tubes normally would be maintained at just below their cut-off point in the absence of any other potentials affecting their grids. It may be assumed, for purposes of illustration, that the grid glow tube $TH_7$ is in a conducting state and that the grid glow tube $TH_8$ is non-conducting or cut off.

When this condition prevails, the grid of tube $V_5$ is well below cut-off point due to the voltage divider action of resistors $R_1$ and $R_2$, the latter being connected directly to the anode of grid glow tube $TH_7$ which is conducting. On the other hand, the grid of tube $V_6$ will be at a potential just below cut-off due to the voltage divider action of resistors $R_4$ and $R_5$. Under these circumstances, positive pulses from the multivibrator comprising the unit H may be impressed onto the multivibrator comprising the unit J only through tube $V_6$, since $V_5$ is biased considerably below the cut-off point.

Referring to Figure 4*a*, there is shown the spacing of a series of pulses impressed onto tube $V_6$ by the multivibrator comprising the unit H and onto which there is impressed the wave whose phase is to be changed under certain conditions. If the beginning of the cycle is assumed to be a time $t_1$, then the multivibrator comprising the unit J would be triggered by the pulse occurring at the time $t_2$ and would continue in this state until it was triggered by the pulse occurring at the time $t_3$, at which time it would return to its original state and the cycle would begin again. The pulse that occurred at the time $t_5$ would trigger the multivibrator again and the pulse at the time $t_7$ would return it to its original state. Two cycles of its normal operation are shown in Fig. 4b. Fig. 4b also shows the time that pulses transmitted through tube $V_5$ would trigger the multivibrator if $V_5$ were made conducting instead of being non-conducting or below cut-off and these pulses are indicated by the dotted lines $P_1$, $P_3$, and $P_4$. It will be seen that if $V_5$ were conducting at the time of pulse $P_1$ (which is supplied by the unit H but which is ineffective due to the cut-off state of $V_5$), then the multivibrator comprising the unit J would be flipped or sent into the alternating portion of its cycle of operation by the pulse $P_1$. For purposes of illustration, the time interval between the time $t_1$ and the occurrence of the pulse $P_1$ has been identified as the time interval $T_1$ and the time interval between the occurrence of pulse $P_1$, which really arrives from the multivibrator unit H but is blocked by tube $V_5$, and the time $t_2$, at which time the transition in the operating state of the multivibrator unit J actually takes place, is identified as the interval $T_2$.

The incoming pulses, which are used as phase shifting pulses under certain conditions, are impressed onto the circuit including rectifier D, resistor 51 and condenser $C_2$. Each of these pulses will store a charge in condenser $C_2$ which is positive at the terminal thereof that is connected to the anode of tube $V_{11}$ due to the rectification thereof by the rectifier D. This then supplies a positive potential to the anode of $V_{11}$. For purposes of illustration, let it be assumed that the grid of $V_{11}$ is at a potential whereby the tube can conduct. This means that the incoming pulse, after rectification, will be conveyed via coupling condenser $C_3$ to the grids of grid glow tubes $TH_7$ and $TH_8$. It has been assumed previously that $TH_7$ was conducting at this time. The result now will be that grid glow tube $TH_8$ will start to conduct. The anode of $TH_7$ is at a lower potential than that of $TH_8$ and, due to the storing of energy in $C_1$, the plate potential of grid glow tube $TH_7$ will be driven below its conducting point and $TH_7$ will be extinguished. The conduction in $TH_8$ will now cause the grid potential of tube $V_6$ to be driven well below the cut-off point and, as a result of the conduction of $TH_8$ and the extinguishing of tube $TH_7$, the conduction states of $V_5$ and $V_6$ are interchanged. This means then that the pulses supplied by the anode of tube $V_2$ in the multivibrator of unit H will control the transition states of the multivibrator comprising the unit J and a reference to Fig. 4, sections b and c thereof, will show that the transition point of the multivibrator of unit J is then shifted to coincide with the lines $P_1$, $P_3$, and $P_4$ of curve b of this figure. It will be seen, therefore, that the wave output of the multivibrator comprising unit J has been advanced one-quarter cycle or 90° with respect to its former transition points which would be $P_2$, $P_5$, etc. This will happen if the pulse, which has been impressed onto the rectifier D of unit M, is allowed to take place in the time $T_1$.

On the other hand, if the impression of the pulse onto the multivibrator of unit J in its assumed state takes place during the interval $T_2$, and this is after the arrival of the pulse $P_1$ from the multivibrator of unit H, and which has been blocked due to the non-conducting state of $V_5$ at this time, the phase shifting pulse impressed on the rectifier D will cause the reversal of action of grid glow tubes $TH_7$ and $TH_8$, thus blocking tube $V_6$ and the next pulse $P_2$ delivered from the unit H will be ineffective and the pulse $P_3$ will pass through tube $V_5$ to change the transition state of multivibrator $MV_2$ which is the unit J. Reference to curve d of Fig. 4 will show that the phase of the output wave from multivibrator $MV_2$ will have been retarded by 90°.

Where this arrangement is used in a synchronizing system and where the pulses impressed on the rectifier D may be the line synchronizing pulses from a facsimile transmitter, for instance, that might arrive either during the time $T_1$ or $T_2$ and thus with the circuit up to this point a random shift of phase might take place, i. e., during one portion of the shifting of phase the wave output of $MV_2$ might be advanced and before the two apparatuses were brought into synchronism, a retarding action of phase might be started. This, of course, is undesirable and this is prevented by the multivibrator comprising unit L and which is of the self-restoring type. It will be noted that the anode of tube $V_9$ of this unit is connected directly to the grid of tube $V_{11}$ of unit M. Additionally, the grid of tube $V_9$ is connected through appropriate differentiating condenser $C_4$ to the anode of tube $V_3$ of multivibrator $MV_2$ which is the unit J. Once per cycle of the output wave of the multivibrator $MV_2$ of unit J, the negative pulses from the tube $V_3$ will be differentiated by condenser $C_4$. These pulses are impressed onto the grid circuit of $V_9$ and will cut off $V_9$ which is normally conducting and by proper choice of the value of $R_9$ and $C_5$ this condition is maintained for a time which is approximately equal to the time $T_1$. During the time interval $T_1$, tube $V_9$ being non-conducting, there will be no potential drop across resistor $R_8$ and the grid of tube $V_{11}$, which is connected to this resistor, will have a potential which is approximately ground potential, and, accordingly, when a pulse is impressed onto the detector D during this interval, the plate voltage of this tube will rise to the degree where a potential pulse occurring across cathode resistor $R_{10}$ may be fed through condenser $C_3$ to affect the conducting states of grid glow tubes $TH_6$ and $TH_8$. Alternatively, during the time $T_2$, the tube $V_9$ will be conducting and the potential drop across resistor $R_8$, due to the anode current of this tube, will be great enough to drive the grid of tube $V_{11}$ sufficiently negative so as to be fairly well below the cut-off point. Accordingly, it is obvious that the pulse impressed on rectifier D can be effective only during the time of the cycle represented by $T_1$. A phase shifting pulse received at a time other than during the interval $T_1$ will be stored by condenser $C_2$ and will cause a pulse through $V_{11}$ only during such time as tube $V_9$ is non-conducting and this is during the interval $T_1$.

It is possible that some applications of phase shifting might require that the wave be retarded instead of advanced in phase. This can be accomplished by assuring that the switching action of the unit L be performed during the time $T_2$ instead of during the time $T_1$ as is illustrated in the drawings. This could be accomplished by controlling the trigger circuit by the anodes of the multivibrator $MV_1$ comprising unit H and switching from one anode to the other after each phase shift by means of the grid glow tubes $TH_7$ and $TH_8$ and an additional set of triodes controlled in the same manner that $V_5$ and $V_6$ are controlled.

It is also possible to advance or retard the wave form provided two separate trains of correction pulses are available or with a single train of pulses having opposite polarities for an advancing or retarding of the wave whose phase is to be shifted.

It will be appreciated that the alternative could be arranged very easily and that tube $V_{11}$ could be controlled so as to make the pulses effective only during the time $T_2$ and hence the phase of the multivibrator $MV_2$ would be changed in incremental steps of 90° which were 90° behind the phase of the input wave to the multivibrator comprising unit H. This will occur until the phase of the control pulses impressed onto the rectifier D bears a selected relationship to the phase of the input pulses to multivibrator $MV_1$. The output signals taken from multivibrator $MV_2$ can, after power amplification, be used to drive a driving motor associated with a facsimile apparatus or a teletype, for instance.

Having now described the invention, what is claimed and desired to be secured by Letters Patent is the following:

1. A phase shifting apparatus comprising a multivibrator, a plurality of switch means connected to said multivibrator for impression of pulses thereon for controlling the transition times at which the multivibrator is changed from one conducting state into another, means to impress the wave whose phase is to be shifted onto said switch means, a source of correction pulses, and means operable under the influence of said correction pulses to select the switch means through which the wave whose phase is to be shifted is impressed onto said multivibrator circuit.

2. A phase shifting apparatus comprising a multivibrator, a plurality of switch means connected to said multivibrator to impress pulses thereon for controlling the transition times at which the multivibrator is changed from one conducting state into another, means to impress the wave whose phase is to be shifted onto said switch means, a source of correction pulses, and means operable under the influence of said correction pulses at selected intervals to select the switch means through which the wave whose phase is to be shifted is impressed onto said multivibrator circuit.

3. A phase shifting apparatus comprising a source of wave energy, a multivibrator having two predetermined states of conduction, switch means interposed between the multivibrator and the source of wave energy, means for impressing onto the switch means the wave energy whose phase is to be shifted, thermionic means connected to said switch means to control the operating level thereof and to select the switch means through which the source of wave energy may control the transition times in the conducting states of the multivibrator, a source of correction pulses, and means for controlling the conduction state of said thermionic means under the influence of the correction pulses.

4. A phase shifter comprising a source of wave energy, a multivibrator having two operating conduction states, a vacuum tube connected between the source of wave energy and each tube included in the multivibrator circuit for controlling the transition times and changing the conduction states of the multivibrator, a thermionic tube connected so as to control the operating level of each of said vacuum tubes, a source of correction pulses, and means for impressing said correction pulses onto said latter thermionic tubes for controlling the conduction state of said thermionic tubes and thereby influencing the transition times in the conduction states of the multivibrator.

5. Apparatus in accordance with claim 4 wherein said thermionic tubes connected so as to control the operating level of each of the vacuum tubes comprises a plurality of grid glow tubes so interconnected that the application of a correction pulse onto said grid glow tubes will fire one of them and cut off the other.

6. Apparatus in accordance with claim 4 wherein the means for impressing the correction pulses onto the thermionic tubes comprises a circuit including a rectifier, electrical energy storage means connected so as to have energy delivered by said rectifier stored therein, means for impressing the correction pulses onto said rectifier, and means coupling said electrical energy storage means to the thermionic tubes to deliver pulses from said electrical energy storage means and to control the conduction states of said thermionic tubes.

7. Apparatus in accordance with claim 6 wherein the means coupling the electrical energy storage means to the thermionic tubes comprises a triode normally biased to cut-off, and means under the influence of the output of said multivibrator for rendering the triode conductive at selected intervals.

8. A phase shifting apparatus comprising a source of wave energy, a first multivibrator having two thermionic tubes cross-connected so as to allow each to influence the conducting state of the other and having an operating frequency which is twice that of the output frequency of the apparatus, a second multivibrator circuit having two thermionic tubes cross-connected so that each influences the conducting state of the other, a first thermionic tube having anode, cathode and control electrodes, a second thermionic tube having anode, cathode and control electrodes, means for impressing pulses delivered by one of the tubes of the first multivibrator onto the control grid of the first thermionic tube, means for impressing the pulses delivered by the other tube of the first multivibrator onto the control grid of the second thermionic tube, a first grid glow tube, a second grid glow tube, means connecting the anode of the first grid glow tube to the grid of the first thermionic tube so as to control the operating level of the first thermionic tube, means connecting the anode of the second grid glow tube to the control grid of the second thermionic tube so as to control the operating level of the second thermionic tube, means coupling the anodes of said grid glow tubes whereby a pulse occurring in the anode of one of said grid glow tubes is impressed onto the anode of the other of said grid glow tubes, a source of correction pulses, a detector, electrical energy storage means connected to said detector so as to have rectified energy stored therein, means for impressing the correction pulses onto said detector so as to rectify the pulses and store energy in said electrical energy storage means, a third thermionic tube having anode, cathode and grid electrodes, means connecting the anode of said third thermionic tube to said detector and to said electrical energy storage means whereby the anode of said tube is energized by the energy stored in the electrical energy storage means, means coupling the output circuit of said third thermionic tube to the control grids of both of said grid glow tubes, a trigger circuit having two tubes cross-connected so as to have two conduction states, means for controlling the conduction state of said trigger circuit under the influence of signals from said second multivibrator, and means to control the conducting state of the third thermionic tube under the influence of said trigger circuit.

ARTHUR E. CANFORA.

REFERENCES CITED

The following references are of record in the file of this patent:

UNITED STATES PATENTS

| Number | Name | Date |
| --- | --- | --- |
| 2,230,822 | Artzt | Feb. 4, 1941 |
| 2,371,905 | Mathes | Mar. 20, 1945 |
| 2,376,392 | Shepherd | May 22, 1945 |
| 2,394,361 | Bruderlin | Feb. 5, 1946 |
| 2,399,421 | Artzt | Apr. 30, 1946 |
| 2,435,207 | Dimond | Feb. 3, 1948 |